(12) United States Patent
Trollmann et al.

(10) Patent No.: US 11,415,723 B2
(45) Date of Patent: Aug. 16, 2022

(54) PROJECTOR WITH THREE-DIMENSIONAL MEASUREMENT DEVICE

(71) Applicant: FARO Technologies, Inc., Lake Mary, FL (US)

(72) Inventors: Jens Trollmann, Ludwigsburg (DE); Stefan Mueller, Ditzingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 17/317,325

(22) Filed: May 11, 2021

(65) Prior Publication Data

US 2021/0263183 A1    Aug. 26, 2021

Related U.S. Application Data

(63) Continuation of application No. 16/445,413, filed on Jun. 19, 2019, now Pat. No. 11,035,980.

(60) Provisional application No. 62/702,620, filed on Jul. 24, 2018.

(51) Int. Cl.
| | |
|---|---|
| *H04N 1/04* | (2006.01) |
| *G01V 8/26* | (2006.01) |
| *G02B 26/08* | (2006.01) |
| *G01B 11/02* | (2006.01) |
| *G01B 11/00* | (2006.01) |
| *G01S 7/4865* | (2020.01) |

(52) U.S. Cl.
CPC ............ *G01V 8/26* (2013.01); *G01B 11/002* (2013.01); *G01B 11/026* (2013.01); *G02B 26/0841* (2013.01); *H04N 1/04* (2013.01); *G01S 7/4865* (2013.01)

(58) Field of Classification Search
CPC .... G01V 8/26; G02B 26/0841; G02B 26/105; G01B 11/026; G01B 11/002; G01S 17/89
See application file for complete search history.

(56) References Cited

U.S. PATENT DOCUMENTS

| | | | | |
|---|---|---|---|---|
| 6,547,397 B1 ‡ | 4/2003 | Kaufman | ............. | G01B 11/002 353/28 |
| 6,935,748 B2 ‡ | 8/2005 | Kaufman | ............... | G03B 21/00 353/28 |
| 7,193,690 B2 ‡ | 3/2007 | Ossig | ................... | G01C 15/002 356/4.01 |
| 7,430,068 B2 ‡ | 9/2008 | Becker | ................... | G02B 26/10 358/511 |

(Continued)

*Primary Examiner* — King Y Poon
*Assistant Examiner* — Michael L Burleson
(74) *Attorney, Agent, or Firm* — Cantor Colburn LLP

(57) ABSTRACT

A device and method for projecting a light pattern is provided. The device includes a processor system and a housing. A three-dimensional (3D) measurement device is operably coupled to the housing that measures a distance to a surface in an environment. A laser projector is operably coupled to the housing, the laser projector having a light source and a pair of movable mirrors, the light source positioned to emit light onto the pair of movable mirrors. Wherein the processor system is responsive to non-transitory executable computer instructions for: determining 3D coordinates of points on the surface with the 3D measurement device; selecting a pattern; causing the laser projector to emit a beam of light and moving the pair of mirrors to generate the pattern on the surface; and adjusting the pattern based at least in part on the 3D coordinates.

20 Claims, 8 Drawing Sheets

(56) References Cited

U.S. PATENT DOCUMENTS

| | | | |
|---|---|---|---|
| 8,705,012 B2 ‡ | 4/2014 | Greiner | G01C 3/00 356/3 |
| 9,074,878 B2 ‡ | 7/2015 | Steffey | G01C 15/002 |
| 9,113,022 B2 ‡ | 8/2015 | Kurita | H04N 7/0135 |
| 9,423,278 B1 ‡ | 8/2016 | Kaufman | B23Q 7/00 |
| 9,513,107 B2 ‡ | 12/2016 | Zweigle | G01S 7/003 |
| 9,529,083 B2 ‡ | 12/2016 | Bridges | G01S 7/4817 |
| 9,551,575 B2 ‡ | 1/2017 | Bridges | G01S 17/86 |
| 9,689,972 B2 ‡ | 6/2017 | Becker | G01S 7/4817 |
| 9,869,755 B2 ‡ | 1/2018 | Becker | G01S 7/4808 |
| 10,132,611 B2 ‡ | 11/2018 | Steffey | G01S 7/4817 |
| 2004/0189944 A1 ‡ | 9/2004 | Kaufman | G01B 11/2513 352/10 |
| 2012/0069325 A1 ‡ | 3/2012 | Schumann | G01C 3/02 356/51 |
| 2014/0300906 A1 ‡ | 10/2014 | Becker | G01S 7/003 356/614 |
| 2015/0043011 A1 ‡ | 2/2015 | Kaufman | G01B 11/2518 356/614 |
| 2015/0085108 A1 ‡ | 3/2015 | Kaufman | G01B 11/24 348/135 |
| 2015/0172635 A1 ‡ | 6/2015 | Kimmel | H04N 13/296 348/51 |
| 2016/0047914 A1 * | 2/2016 | Zweigle | G09B 29/004 356/5.01 |
| 2017/0018711 A1 ‡ | 6/2017 | Kawakami | C07D 209/86 |
| 2017/0184710 A1 ‡ | 6/2017 | Becker | G01S 17/32 |
| 2017/0193781 A1 ‡ | 7/2017 | Bryson | H04W 4/021 |
| 2017/0336508 A1 * | 11/2017 | Zweigle | G01S 17/89 |
| 2019/0257642 A1 ‡ | 8/2019 | Hillebrand | G01S 17/86 |
| 2020/0033500 A1 | 1/2020 | Trollmann | |

\* cited by examiner
‡ imported from a related application

PROJECTOR WITH THREE-DIMENSIONAL MEASUREMENT DEVICE

CROSS REFERENCE TO RELATED APPLICATIONS

This present application is a continuation of and claims the benefit of U.S. Non-Provisional patent application Ser. No. 16/445,413 filed Jun. 19, 2019, which claims the benefit of U.S. Provisional Application Ser. No. 62/702,620 filed Jul. 24, 2018, the entire disclosure of which is incorporated herein by reference.

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

Accordingly, while existing 3D scanners are suitable for their intended purposes, what is needed is a 3D scanner having certain features of embodiments of the present invention.

BRIEF DESCRIPTION

According to one embodiment, a device is provided. The device includes a processor system and a housing. A three-dimensional (3D) measurement device is operably coupled to the housing that measures a distance to a surface in an environment. A laser projector is operably coupled to the housing, the laser projector having a light source and a pair of movable mirrors, the light source positioned to emit light onto the pair of movable mirrors. Wherein the processor system is responsive to non-transitory executable computer instructions for: determining 3D coordinates of points on the surface with the 3D measurement device; selecting a pattern; causing the laser projector to emit a beam of light and moving the pair of mirrors to generate the pattern on the surface; and adjusting the pattern based at least in part on the 3D coordinates.

According to another embodiment, a method is provided. The method including emitting a plurality of first light beams from a three-dimensional (3D) measurement device and receiving the plurality of first light beams with a sensor, determining, with a processor system, 3D coordinates of points on a surface are determined, with a processor system, based at least in part on the emitting and receiving of the plurality of first light beams. A pattern is selected. A second light beam is emitted from a laser projector. The direction of the second light beam is changed to form the pattern on the surface. The pattern is adjusted based at least in part on the 3D coordinates.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D measuring device having a 3D scanner and a laser projection system. Embodiments of the invention provide advantages acquiring three-dimensional (3D) coordinates of an area of the environment and using these 3D coordinates to emit a light pattern on the area with the laser projector based at least in part on the 3D coordinates.

Figure 1:
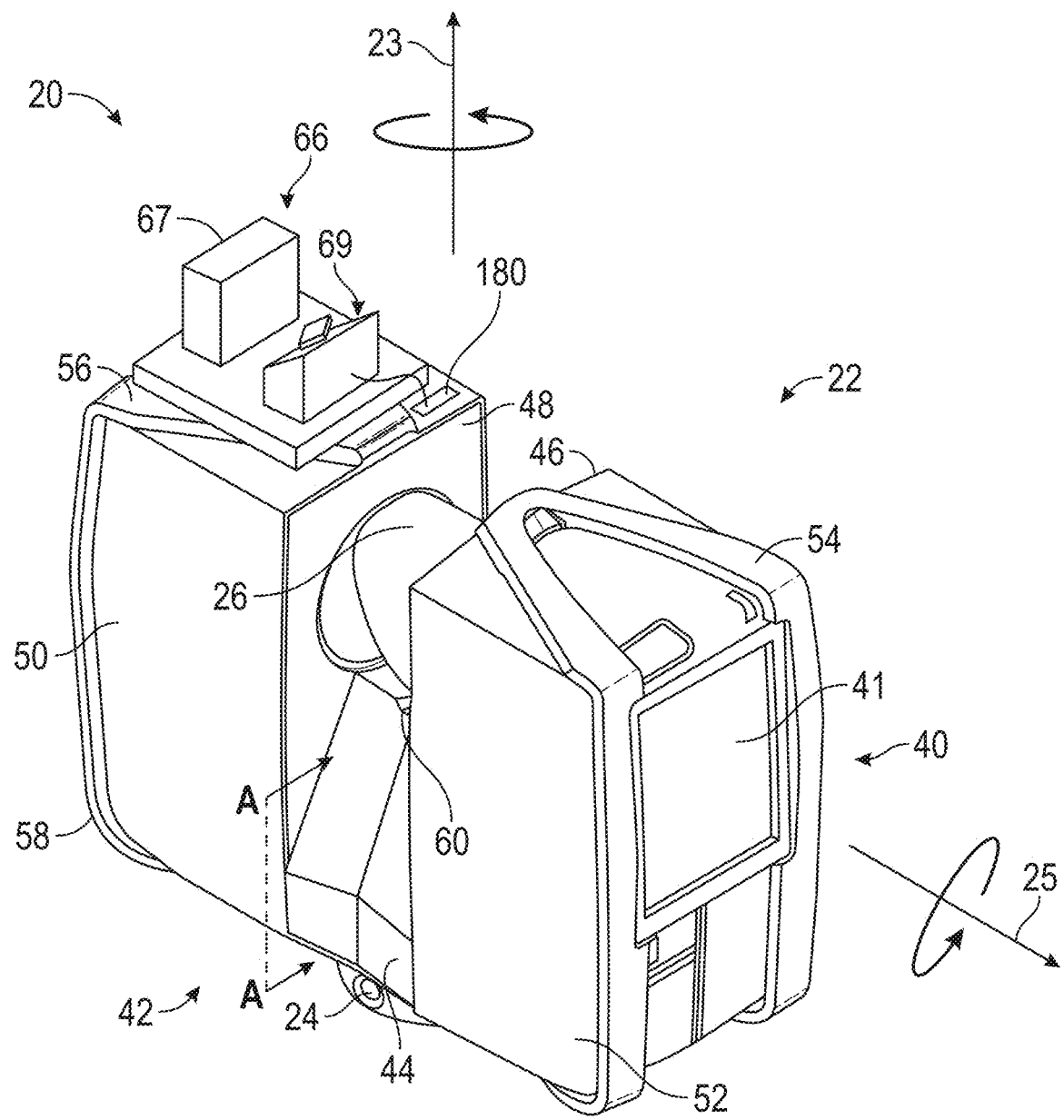
FIG. 1 is a perspective view of a laser scanner in accordance with an embodiment of the invention.
Figure 2:
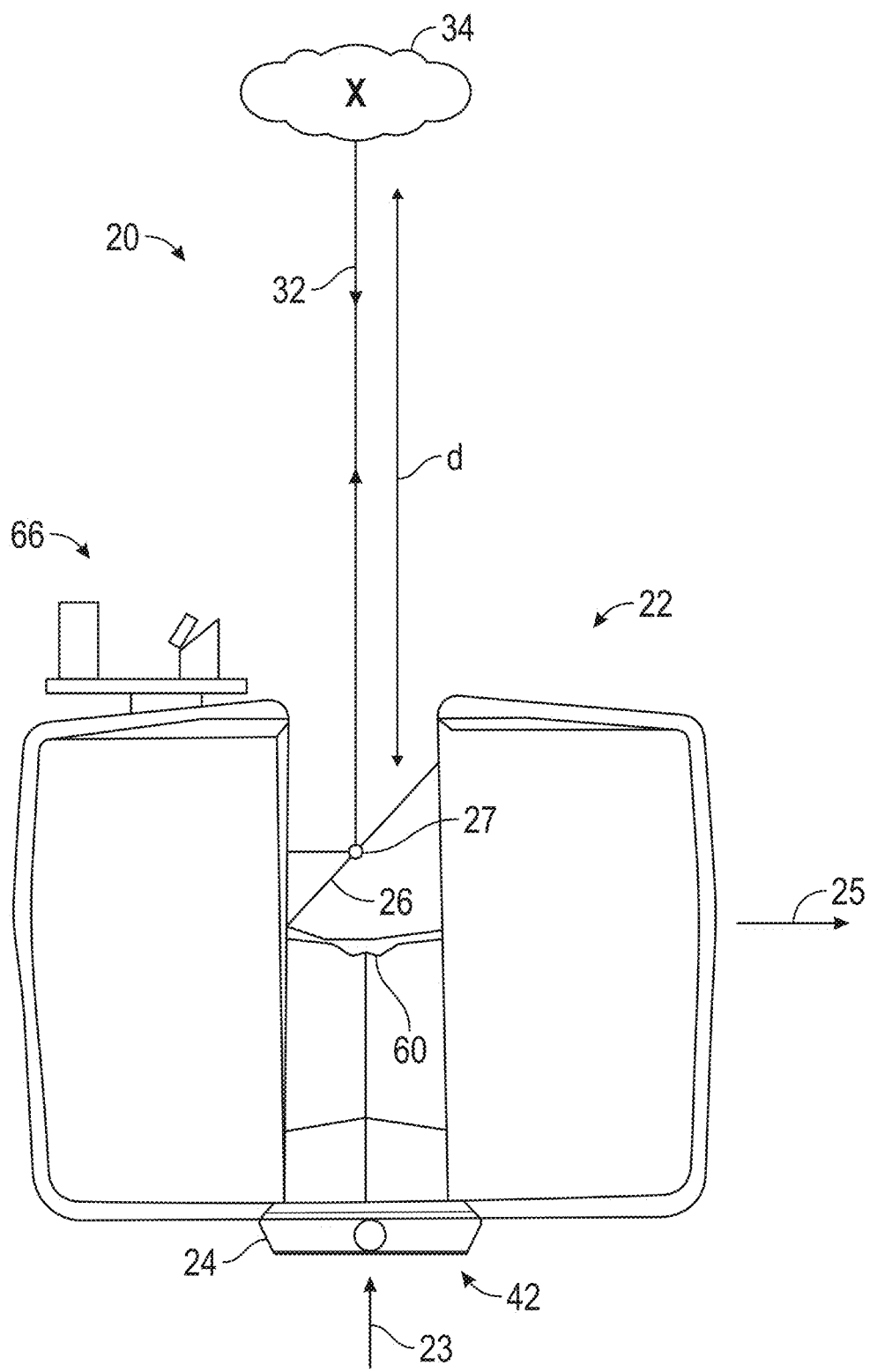
FIG. 2 is a side view of the laser scanner illustrating a method of measurement according to an embodiment.
Figure 3:
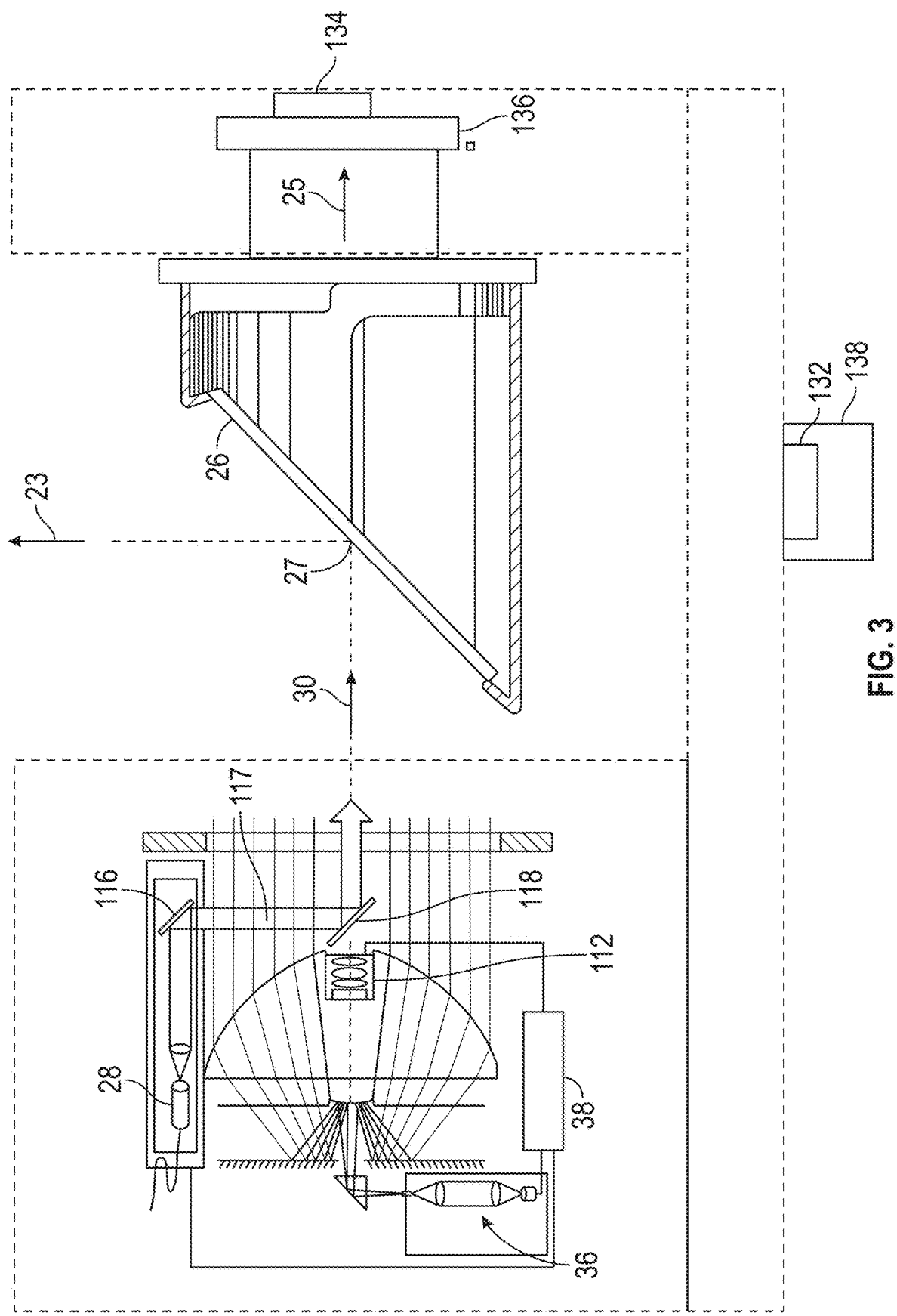
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. It should be appreciated that while embodiments herein refer to the measurement device as a laser scanner, this is for exemplary purposes and the projection system and method described herein may be used with any 3D coordinate measurement system, such as but not limited to a triangulation scanner, an area scanner, a structured light scanner and a laser tracker for example. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a beam steering unit, such as a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter or light source, such as light emitter 28, for example, that emits a light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d. It should be appreciated that while embodiments herein refer to the measurement device as a laser scanner, this is for exemplary purposes and the projection system and method described herein may be used with any 3D coordinate measurement system, such as but not limited to a triangulation scanner, an area scanner, a structured light scanner and a laser tracker for example.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the graphical touch screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse member 44 adjacent the base 24. The first arm portion 58 for each yoke 54, 56 extends from the traverse member 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the carrying structure 42, the walls 46, 48 and the shells 50, 52 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 52, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse member 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse member 44. When the rotary mirror 26 rotates, during each rotation the rotary mirror 26 directs the emitted light beam 30 onto the traverse member 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

As described in more detail herein, in an embodiment a laser projector system 66 is coupled to the measuring head 22. The laser projector system 66 includes a light source 67 and a beam steering unit 69. In the illustrated embodiment, the light source 67 is a laser light source (e.g. coherent light) or a light emitting diode (LED). In the illustrated embodiment, the beam steering unit 69 includes a mirror system containing one or more rotatable mirrors to change the direction of the light emitted by the light source 67. The laser projector system 66 is configured to rapidly change the direction of the light emitted by the light source 67 using the beam steering unit 69. By rapidly and repeatedly moving or tracing the emitted light over an area in the shape of a pattern, an image in the shape of the pattern may be created on the surface where the light is projected. It should be appreciated that the 3D coordinates of a surface may be used to modify the direction of the emitted light, i.e. to adapt the shape, size or scale of the generated light pattern to the projection surface. From this the present laser scanner 20 allows for the emitting of a light pattern that is sized to be appropriate for the image that is desired to be generated. Thus, the laser scanner 20 may be placed in an ad-hoc manner within the environment and the light pattern will be shaped and scaled to generate the desired pattern of light automatically.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the rotary mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm, 950 nm or 1550 nm), with the dichroic beam-splitter 118 configured to reflect the infrared laser light while allowing visible light (e.g., wavelengths of 400 to 700 nm) to transmit through. In other embodiments, the determination of whether the light passes through the dichroic beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the rotary mirror 26 about the axis 25.

Figure 4:
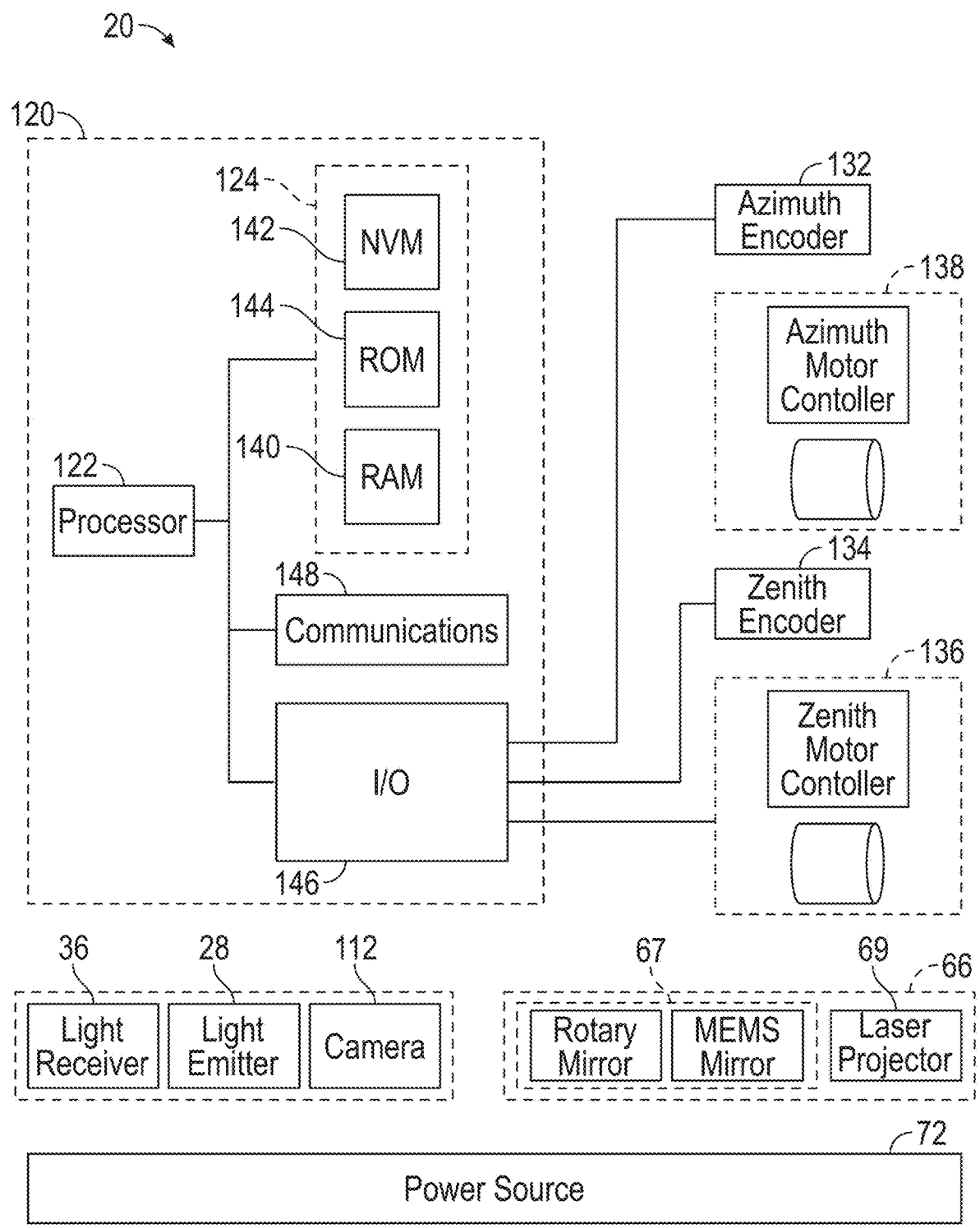
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 120 is a suitable electronic device capable of accepting data and instructions, executing the instructions to process the data, and presenting the results. The controller 120 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 120 is capable of converting the analog voltage or current level provided by light receiver 36 into a digital signal to determine a distance from the laser scanner 20 to an object in the environment. Controller 120 uses the digital signals that act as input to various processes for controlling the laser scanner 20. The digital signals represent one or more laser scanner 20 data including but not limited to distance to an object, images of the environment, images acquired by camera 112, the pattern of light 171 (FIG. 7), angular/rotational measurements by a first or azimuth encoder 132, and angular/rotational measurements by a second axis or zenith encoder 134.

In general, controller 120 accepts data from encoders 132, 134, light receiver 36, light emitter 28, and camera 112 and is given certain instructions for the purpose of generating a 3D point cloud of a scanned environment. Controller 120 provides operating signals to the light emitter 28, light receiver 36, camera 112, zenith motor 136 and azimuth motor 138. The controller 120 compares the operational parameters to predetermined variances and if the predetermined variance is exceeded, generates a signal that alerts an operator to a condition. The data received by the controller 120 may be displayed on a display device 40 coupled to controller 120. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 120. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 120 may also be coupled to external computer networks such as a local area network (LAN) and the Internet. A LAN interconnects one or more remote computers, which are configured to communicate with controller 120 using a well-known computer communications protocol such as TCP/IP (Transmission Control Protocol/Internet(^) Protocol), RS-232, ModBus, and the like. Additional laser scanners 20 may also be connected to LAN with the controllers 120 in each of these laser scanners 20 being configured to send and receive data to and from remote computers and other laser scanners 20. The LAN may be connected to the Internet. This connection allows controller 120 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 148 provides an interface that allows wireless or wired communication with one or more external devices or networks, such as the LAN discussed above.

Figure 8:
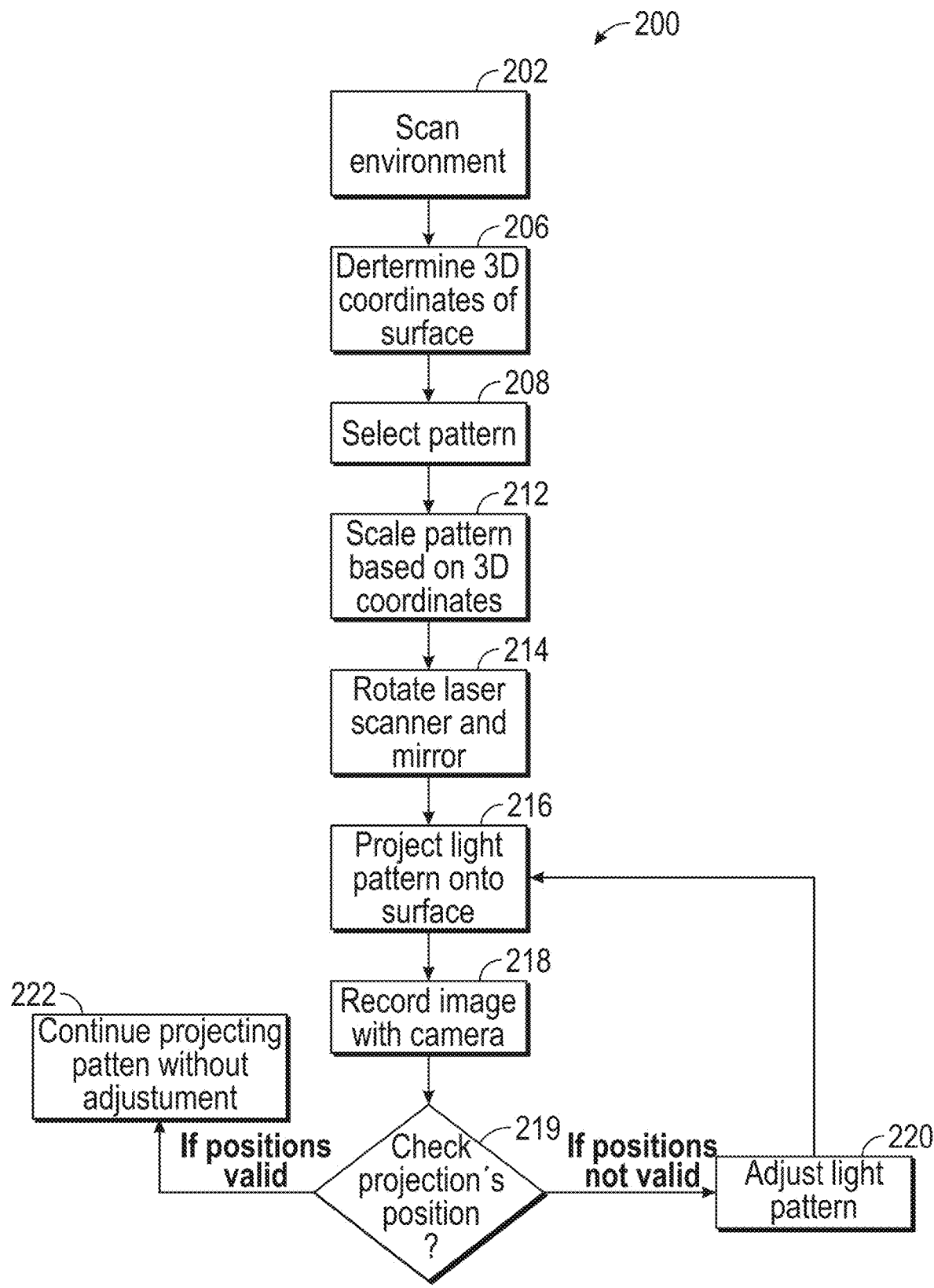
FIG. 8 illustrates a flow diagram of the operation of the laser scanner of FIG. 1.

Controller 120 includes operation control methods embodied in application code shown in FIG. 8. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
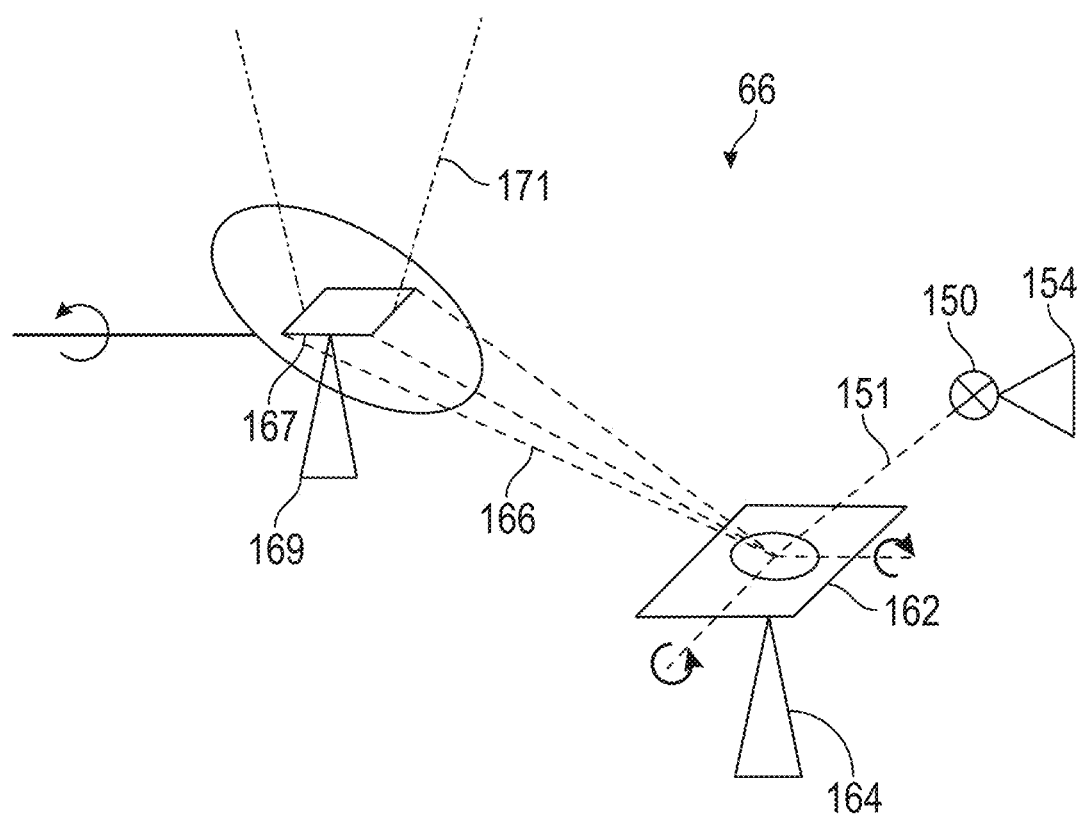
FIG. 5 illustrates a schematic illustration of a laser projector for use with the laser scanner of FIG. 1.

Referring now to FIG. 5, an embodiment is shown of the laser projector system 66. The laser projector system 66 includes a light source 150, such as a laser light source for example. In an embodiment, the light source 150 is mounted to a support structure 154. The light source projects the light 151 onto a first mirror 162.

Figure 6:
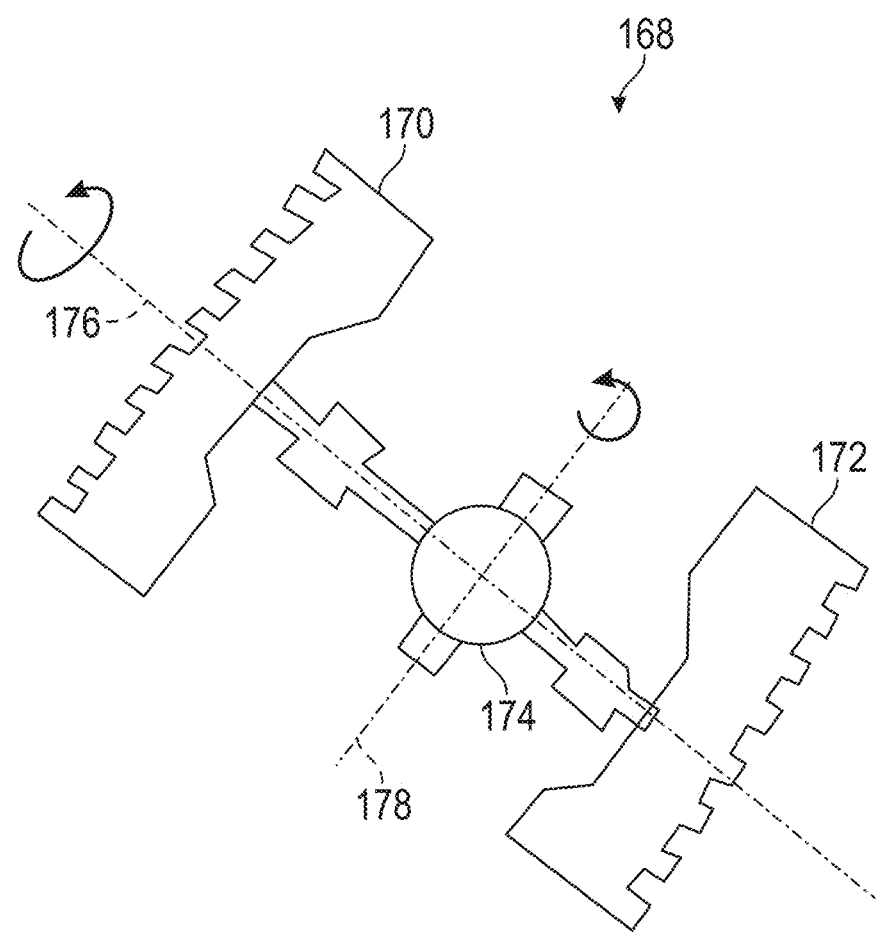
FIG. 6 illustrates a schematic illustration of a two-dimensional (2D) microelectromechanical system (MEMS) that includes a mirror.

In the embodiment of FIG. 5, the mirror 162 is coupled to a suitable mechanism 164 that is configured to rotate the mirror 162 about two orthogonal axes. In an embodiment, the mirror 162 and mechanism 164 are a microelectromechanical system (MEMS) 168 as shown in FIG. 6 (sometimes referred to as a micro-opto-electromechanical system, or MOEMS). In this embodiment, the MEMS system 168 includes actuators 170, 172 that rotate the mirror 174 about a pair of orthogonal axis 176, 178. The actuators 170, 172 may be electrostatic, electromagnetic, thermoelectric, or piezo-electric actuators for example. In an embodiment, the MEMS system 168 is a model S13124-02H 2D Linear Mirror manufactured by Hamamatsu Photonics K.K. of Shizuoka Pref., Japan. It should be appreciated that the use of MEMS mirrors is noted for exemplary purposes and the claims should not be so limited. In other embodiments, mirrors inclinable by different mechanisms are used, e. g. mirror galvanometers. It should be appreciated that while the illustrated embodiment describes mirror galvanometers, this is for exemplary purposes and the claims should not be so limited. In other embodiments, other types of mechanisms for moving the mirrors may be used.

The mirror 162 reflects the light 166 (e.g. laser light) onto another rotary mirror 167. In an embodiment, the rotary mirror 167 is mounted on a rotary mount 169, such that the vertical beam direction may be changed. The rotary mirror 167 reflects the light or laser beam 171 into the environment where it strikes the surface on which the light pattern is to be projected. By rotating the laser scanner 20 around its panorama axis 23, the laser beam 171 may be rotated in the horizontal direction (when the scanner 20 is oriented in the position show in FIG. 2). It should be appreciated that, by changing the rotating angle of rotary mirror 167, and changing the laser scanner 20 rotating angle about the axis 23, the laser pattern, defined by the fast-movable mirror 162, may be directed over a wide field of view.

In an embodiment, the laser projection system 66 is removably coupled to the measuring head 22. In an embodiment, the measuring head 22 includes a port 180 (FIG. 1) that is electrically coupled to the controller 120, such as via the I/O controller 146 for example. The port 180 may further provide electrical power for operating the laser projection system 66. In this embodiment, the laser projector system 66 is coupled to the controller 120 via the port 180. In an embodiment, the controller 120 includes control methods that transmit signals to the rotary mount 169 and the mechanism 164 to rapidly change the direction of the output light or laser beam 171.

It should be appreciated that while the illustrated embodiment shows both mirrors 162, 167 as being movable, this is for exemplary purposes and the claims should not be so limited. In other embodiments, one of the mirrors 162, 167 may be stationary. Further, in some embodiments, the rotary mirror 167 may be eliminated when the mirror 162 has sufficient angular range. Moreover, in another embodiment, the mirror 162, which is shown as rotatable along two axes, may be replaced by two mirrors that are rotatable along one axis each.

Figure 7:
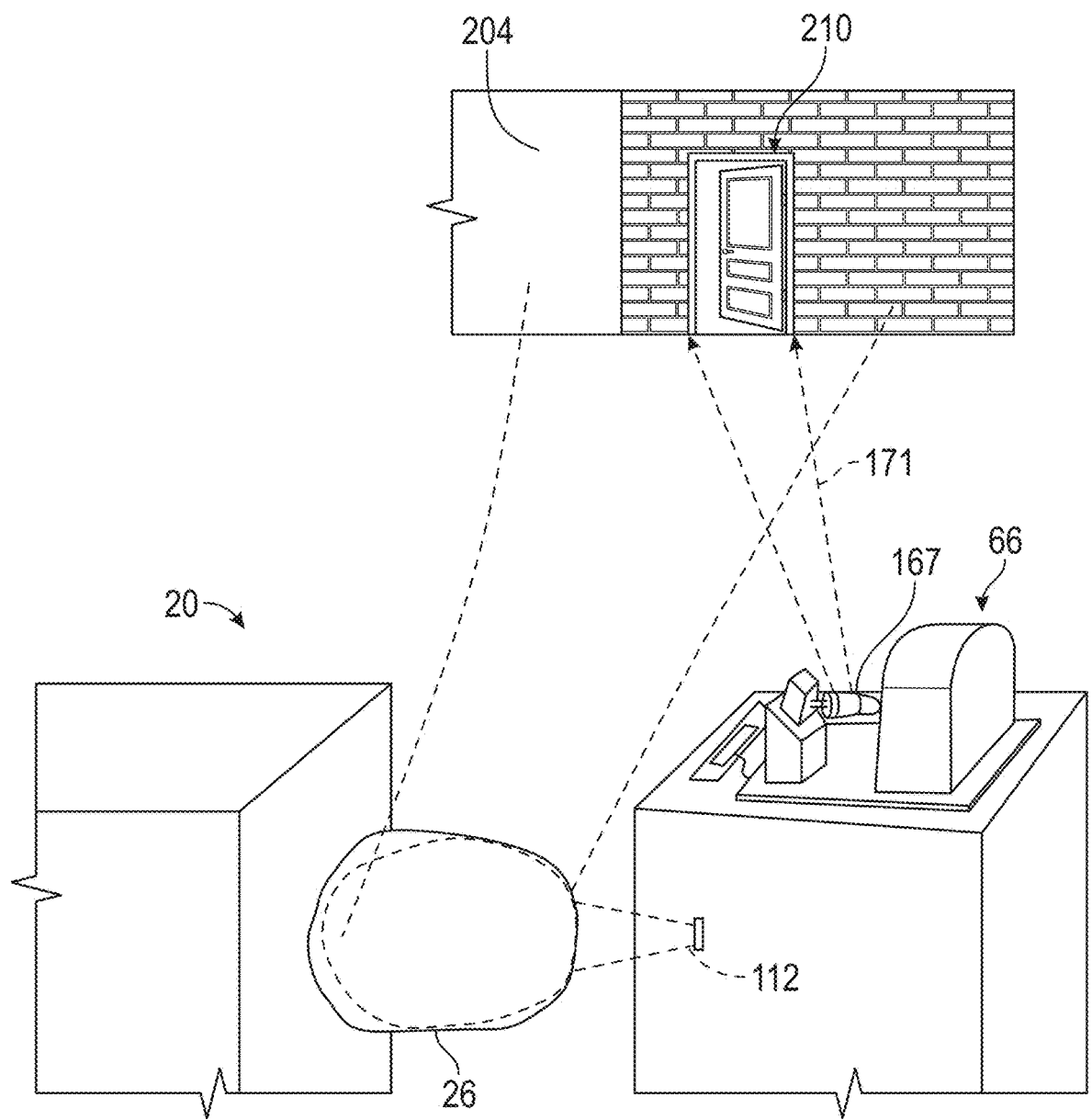
FIG. 7 illustrates a schematic illustration of a laser scanner with a laser projector mounted to the housing in accordance with an embodiment.

Referring now to FIG. 7 and FIG. 8 a method 200 is shown for operating the laser scanner 20 of FIG. 1. The method 200 starts in block 202 where the environment is scanned using the laser scanner 20 in the manner described herein. The scan of the environment will include one or more surfaces 204 that the user desires to project a light pattern. The method 200 proceeds to block 206 where the 3D coordinates of a collection of points (sometimes referred to as a "point cloud") in the environment are determined. It should be appreciated that the collection of points will include points on the surface 204.

With the 3D coordinates determined, the position of the laser scanner 20, and hence the position and pose of the laser projector system 66, relative to the surface 204 is known after performing a system calibration. The method 200 then proceeds to block 208 where the user selects a pattern that is to be projected onto the surface 204. The pattern may be an outline of a door 210 for example. The scaling of the pattern of light will be based at least in part on the 3D coordinates of the points on surface 204. Since the size of the light pattern on the surface 204 will change based on the position of the laser scanner 20 relative to the surface 204, the method 200 then proceeds to scale the pattern of light 171 in block 212 so that the image created by rapidly tracing the light 166 generates an image of the desired size (e.g. the size of the doorway). In an embodiment, the pattern of light may also be changed to accommodate the pose of the laser scanner 20 (e.g. the angle upon which the light 166 is projected).

The method 200 then proceeds to block 214 where the laser scanner 20 rotates about the axis 23 and the rotary mirror 26 about the axis 25 so the portion of the surface 204 that the pattern of light 171 will be projected is within the field of view of both the laser projector system 66 and the camera 212. With the laser scanner 20 in the desired orientation, the laser projector system 66 projects light 166 in block 216 onto surface 204. It should be appreciated that by rapidly and repeatedly changing the direction of the light 166, an image of the pattern of light 171 will be generated on the surface 204. In an embodiment, the light 166 traces over the pattern of light 171 at a rate of 5-100 times per second.

The method 200 then proceeds to block 218 where an optional step of recording an image of the pattern of light 171 is performed with the camera 112. In an embodiment, the camera 112 is used to actively compensate the projected positions for positioning errors. The laser scanner 20 provides calibration data between pixel positions as captured by the camera 112 (e.g. captures of the projected pattern) and the 3D positions as recorded by a laser scan, which is referred to herein as a "calibration link". In an embodiment, the user defines 3D positions where a projection shall be drawn. By using the calibration link between laser scanner 20 3D data and camera 112 data it can be determined, if the projected image corresponds with the user defined 3D positions. As discussed in more detail below, to reach agreement between projection and acquired 3D data a compensation loop for projection errors may be used. It should be appreciated that this compensation loop is optional. In some embodiments, a single calibration may be performed when the system is manufactured.

The method 200 then proceeds to query block 219 where the position of the image is compared to a desired position using the image acquired by the camera 112 and the 3D scan data. When the query block 219 returns an indication that the position of the image is not valid, then the method 200 proceeds to block 220 where the pattern of light 171 may be adjusted based on the recorded image. It should be appreciated that an adjustment may be necessary, due to a varying position of the removable laser projection device, or due thermal, mechanical or electrical influences on the actual versus the recent compensated laser pointing direction. In an embodiment, the pattern may be provided by CAD-data, superimposed to the collection of points (e.g. the point cloud). In another embodiment, the pattern may be drawn directly into the recorded point cloud, and then be transferred to the projection device. Once the image is adjusted, the method 200 then loops back to block 216 and the process continues until the image is in the desired location.

When the query block 219 returns an indication that the projected image is in the desired location, the method 200 proceeds to block 222 where the image continues to be projected without adjustment.

Technical effects and benefits of embodiments include the projection of light from a laser projector and the generating of images on surface in an environment based on 3D coordinates measured by a laser scanner.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device comprising:
   a processor system;
   a housing;
   a three-dimensional (3D) measurement device operably coupled to the housing that measures a distance to a surface in an environment;
   a laser projector operably coupled to the housing, the laser projector having a light source and a pair of movable mirrors, the light source positioned to emit light onto the pair of movable mirrors; and
   wherein the processor system is responsive to non-transitory executable computer instructions for:
   determining 3D coordinates of points on the surface with the 3D measurement device;

selecting a pattern;

causing the laser projector to emit a beam of light and moving the pair of mirrors to generate the pattern on the surface; and adjusting the pattern based at least in part on the 3D coordinates.

2. The device of claim 1, wherein the 3D measurement devices measures the distance based at least in part on the speed of light.

3. The device of claim 1, wherein the adjusting of the pattern includes at least one of scaling the pattern and changing the position of the pattern.

4. The device of claim 1, further comprising a pair of galvanometers are mirror galvanometers.

5. The device of claim 1, wherein:

the housing rotates about an axis; and the processor system is further responsive to rotating the housing to generate the pattern on the surface.

6. The device of claim 1, further comprising an image sensor that records an image of the surface.

7. The device of claim 6, wherein the processor system is further responsive to comparing a position of an image of the pattern on the surface in the image with a predetermined position and determining a projection error.

8. The device of claim 7, wherein adjusting of the pattern is further based at least in part on the projection error.

9. The device of claim 8, wherein the adjusting of the pattern is further based at least in part on an electronic model.

10. The device of claim 1, wherein the electronic model includes CAD data.

11. A method comprising:

emitting a plurality of first light beams from a three-dimensional (3D) measurement device and receiving the plurality of first light beams with a sensor;

determining, with a processor system, 3D coordinates of points on a surface based at least in part on the emitting and receiving of the plurality of first light beams;

selecting a pattern;

emitting from a laser projector a second light beam;

changing the direction of the second light beam to form the pattern on the surface; and adjusting the pattern based at least in part on the 3D coordinates.

12. The method of claim 11, wherein the determining of the 3D coordinates is based at least in part on the speed of light.

13. The method of claim 11, wherein the adjusting of the pattern includes changing the position of the pattern.

14. The method of claim 11, wherein the adjusting of the pattern includes scaling the pattern.

15. The method of claim 11, wherein the 3D measurement device and laser projector are operably coupled to a housing.

16. The method of claim 15, further comprising rotating the housing about an axis to direct the second light onto the surface.

17. The method of claim 11, further comprising:

recording an image of the surface with the pattern;

comparing a position of the pattern in the image with a predetermined position; and determining a projection error based at least in part on the comparing of the position of the patter in the image.

18. The method of claim 17, wherein the adjusting of the pattern is further based at least in part on the projection error.

19. The method of claim 18, wherein the adjusting of the pattern is further based at least in part on an electronic model.

20. The method of claim 18, wherein the electronic model includes CAD data.

* * * * *